United States Patent [19]
Steiner et al.

[11] 3,759,567
[45] Sept. 18, 1973

[54] VEHICLE WITH PASSENGER SEATS

[75] Inventors: Daniel Steiner, Schaffhausen; Ernst Blöchlinger, Neuhausen, both of Switzerland

[73] Assignee: Schweizerische Industrie Gesellschaft, Neuhausen, Switzerland

[22] Filed: Sept. 17, 1971

[21] Appl. No.: 181,505

[30] Foreign Application Priority Data
Sept. 24, 1970 Austria ........................... A 8632/70
Aug. 27, 1971 Austria ........................... A 7522/71

[52] U.S. Cl. ..................... 296/63, 296/68, 296/164
[51] Int. Cl. ................................................. B60n 1/04
[58] Field of Search ...................... 296/146, 63, 68, 296/65 R, 25, 1 R; 297/326, 325, 310, 271, 217; 104/122; 180/11; 280/163, 164

[56] References Cited
UNITED STATES PATENTS

| | | | |
|---|---|---|---|
| 1,636,619 | 7/1927 | Archer | 104/122 X |
| 3,044,645 | 7/1962 | Smith | 214/85 X |
| 2,751,027 | 6/1965 | McLaughlin | 297/217 X |
| 945,748 | 1/1910 | Butler et al. | 104/122 |
| 2,822,055 | 2/1958 | Ludowici | 180/11 X |
| 3,488,086 | 1/1970 | Himka et al. | 296/65 R |
| 3,542,417 | 11/1970 | Mohs | 296/146 |

Primary Examiner—Benjamin Hersh
Assistant Examiner—John A. Pekar
Attorney—E. J. Berry et al.

[57] ABSTRACT

A passenger vehicle having an enclosed passenger compartment containing a passenger seat. The floor of the vehicle is the floor of the compartment and is attached to the passenger seat. To facilitate passenger entrance and exit from the compartment, the floor and attached seat pivot to lower the floor. The canopy cover over the compartment elevates and the side door of the compartment opens to permit passenger entrance and exit.

10 Claims, 5 Drawing Figures

VEHICLE WITH PASSENGER SEATS

The present invention concerns a vehicle with passenger seats.

In vehicles, particularly those in which accelerations of more than about 0.8 metre/sec arise at starting, braking and in travellling through sharp bends, it is desirable that the passengers should have seats providing a flat sitting position, such as are today usual in motor cars. Such seats, having a seat height of about twelve inches and a rearward-sloping back, possibly in conjunction with a slightly forward-rising footboard, ensure a comfortable support of the passenger's body and also a low centre of gravity in the occupied vehicle even when acceleration effects arise.

The drawback of this seat arrangement is that particularly handicapped and elderly people lacking agility have trouble in seating themselves and especially in rising again and often require another person's aid. In the case of low-roofed vehicles, it is necessary to manoeuvre oneself into the seat sideways, as is generally in practice with present-day closed motor cars, In roofless or open vehicles, one might step into the car upright, but must still rise again from a very low seat height.

The object of the present invention is to eliminate the aforesaid drawbacks by providing a system wherein the vehicle floor is lowerable to the roadway for the purpose of passenger change.

An embodiment of the invention claimed hereunder is now to be described by way of example with reference to the accompanying drawing, in which:

Figure 1:
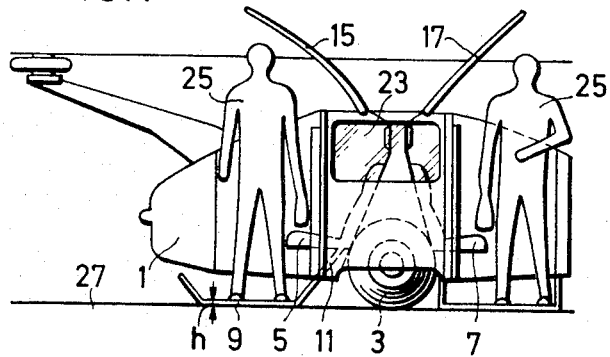
FIG. 1 shows a side view of the vehicle, with its floors lowered to the roadway for passenger change.

FIGS. 1 to 5 show a single-axle vehicle 1 with two wheels 3. Inside, the vehicle presents front passenger seats 5 and rear passenger seats 7 and, accordingly, a front floor 9 tiltable about an axis 11 and a rear floor 13 lowerable in elevator fashion by electrical, mechanical, pneumatic or hydraulic means, for instance, The vehicle 1 is further provided with a front roof part 15 and a rear roof part 17, shown opened in FIG. 1. Let into both side walls of the vehicle 1 are windows 23. The vehicle shown provides room for four passengers 25, shown on the point of boarding and alighting, respectively. It can be designed as a steerable power vehicle or as a trailer. It travels on a roadway 27. The ground clearance of the floors 9, 13 is indicated by H, the floor thickness by h. The seat height is S. One of the side walls of the vehicle 1 can be closed by a front hinged and folding door 19 and a rear hinged and folding door 21. The other side wall 34 is of a piece, except for the window openings. With the doors 19 and 21 closed, the cross-memebers 35 joined to the side wall 34 form with the latter a frame sufficiently strong to give the passengers good protection in collision. This frame construction is essential, as the relatively thin and movable floors 9, 13 cannot resist any major impact. The doors 19 and 21 are therefore reinforced.

Figure 2:
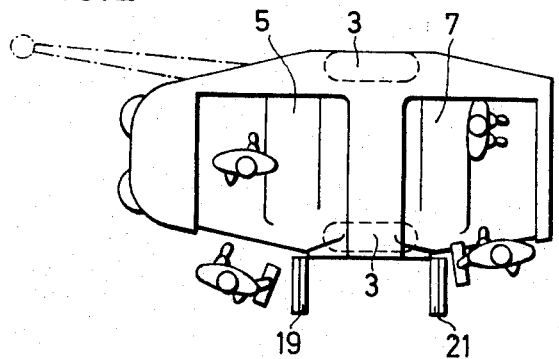
FIG. 2 shows a top view of the vehicle according to FIG. 1, with parts of the roof removed.

For boarding and alighting, the roof parts 15, 17 are opened upwards, as shown in FIG. 1, and the floors 9, 13 are lowered mechanically, hydraulically or electrically; in this, the front floor 9 tilts about its axis 11, while the rear floor is lowered to the roadway 27 in elevator fashion. At the same time, the front and rear doors 19, 21 are opened. As shown in FIGS. 1 and 2, the passengers 25 are boarding the empty front of the vehicle 1 and alighting from the rear, respectively. They can easily seat themselves on the seats 5, as the distance between seat and floor is sufficiently large. Also, the passengers alighting have no trouble in rising from the seats 7 with the floor 13 lowered.

Figure 3:
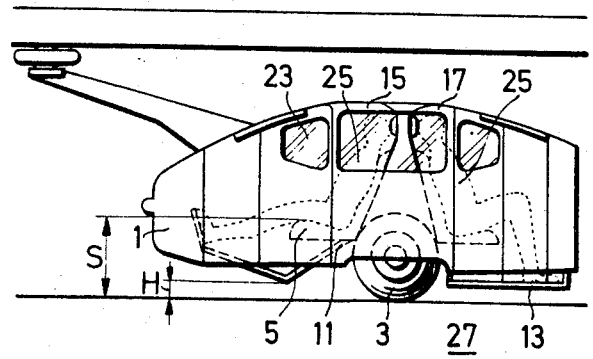
FIG. 3 shows a side view of the vehicle with its floors raised, ready for travelling.
Figure 4:
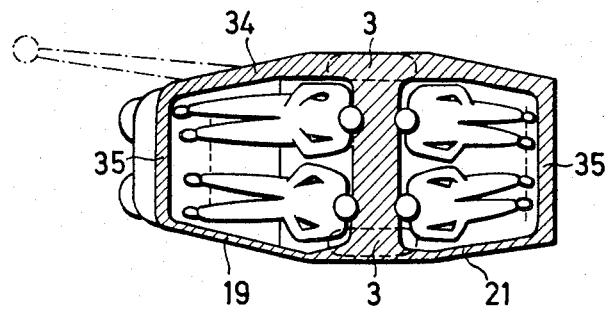
FIG. 4 shows a top view of the vehicle according to FIG. 3, with parts of the roof removed.

After passenger change, the floors 9, 13 are lifted, as shown in FIGS. 3 and 4, so that the passengers are seated comfortably in a semi-reclining manner, owing to the foot-resting level of the lifted floors 9, 13 and the sloping seat backs, making travelling very pleasant even at high accelerations. Control of the movable floors 9, 13 can be action-connected to the opening and closing mechanism of the vehicle doors 19, 21 and/or the movable roof parts 15, 17.

Figure 5:
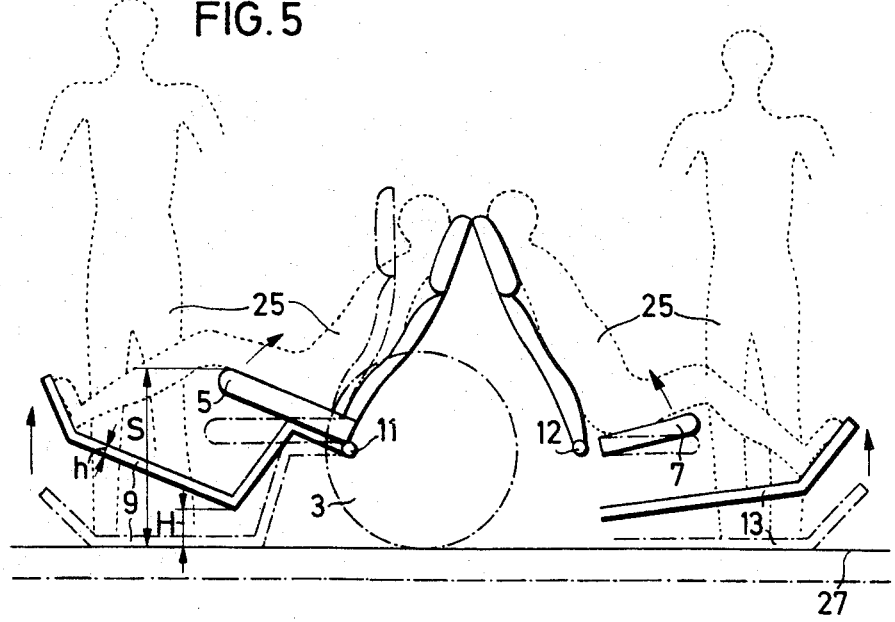
FIG. 5 shows a side view of part of the vehicle, with its floors and seats ready for travelling, and, indicated by broken lines, with its floors lowered to the road-way and its seats tilted forwards for passenger change.

In the embodiment shown in FIG. 5, the passenger seats 5 and 7 are joined to the floors 9 and 13, respectively. They can be tilted about the axes 11 and 12, so that in the lowered position, i.e. for passenger change, they take up the position indicated by the broken lines. This makes alighting easier for the passenger and also prevents any sharp falling-back in sitting down. As shown in FIG. 5, it is possible to tilt the back and head rest joined to the seat with the seat itself, or to arrange these parts for separate tilting for extra positional adjustment with respect to the actual seats.

Such a vehicle with lowerable floor and especially in conjunction with suitably arranged doors and an upward-opening roof permits even handicapped passengers to board, sit down, rise ansd alight without any trouble, even when the vehicle has a low system height. Another advantage is that there is no need for raised ramps, as the floor when lowered is practically level with the ground.

We claim:

1. A ground vehicle comprising: an enclosed passenger compartment; at least one passenger seat in said compartment; said compartment having a floor; said compartment having support means connected with said floor for normally supporting said floor above road level and for selectively lowering said floor to ground level and raising it to compartment level to facilitate entrance and exit from said vehicle; and said seat being attached in said compartment just above said floor.

2. Vehicle according to claim 1, characterized in that the movable vehicle floor is operated by one of mechanical, electrical, pneumatic or hydraulic means.

3. The vehicle of claim 1, wherein said vehicle compartment has a door means which is openable and which is connected with said floor so as to open when said floor lowers and to close when said floor raises.

4. The vehicle of claim 1, wherein there are two said seats in said compartment; said floor being in separately movable sections, with each said section being just beneath its respective said seat and each said floor section having respective supporting means and being separately lowerable by its said supporting means.

5. The vehicle of claim 1, wherein said supporting means is a horizontal pivot and said floor pivots about said pivot from road level to above road level, and vice versa.

6. The vehicle of claim 5, further comprising: means for selectively raising and lowering said seat to correspond with movement of said floor.

7. The vehicle of claim 5, wherein said seat is connected with said floor so as to be pivotable therewith and said seat is so oriented with respect to said pivoting floor that said seat is movable between a tilted back and up posiiton when said floor is raised and a tilted forward and down position when said floor is lowered.

8. The vehicle of claim 7, wherein said vehicle compartment has a door means which is openable and which is connected with said floor so as to open when said floor lowers and to close when said floor raises.

9. The vehicle of claim 8, wherein said door means comprises a side door next to said seat and a roof above said seat, both of which open and close together.

10. The vehicle of claim 7, wherein there are two said seats in said compartment; said floor being in separately movable sections, with each said section being just beneath its respective said seat and each said floor section having respective supporting means and being separately pivotable and supported by its respective said supporting means.

* * * * *